Patented Aug. 18, 1931

1,819,080

UNITED STATES PATENT OFFICE

CHARLES S. DEWEY, OF HAMBURG, NEW YORK, ASSIGNOR TO NATIONAL ANILINE & CHEMICAL COMPANY, INC., OF NEW YORK, N. Y., A CORPORATION OF NEW YORK

PRODUCTION OF TRISAZO DYES

No Drawing.  Application filed June 5, 1929.  Serial No. 368,741.

This invention relates to the production of new and valuable trisazo dyes for dyeing cotton and other fibres. Materials dyed with the new dyestuffs also form a part of the present invention.

The new trisazo dyes of the present invention can be obtained by coupling a diazotized 2-amino naphthalene disulfonic acid (first component) having the following probable formula

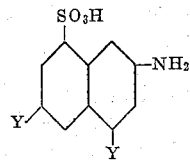

wherein one Y represents hydrogen and the other Y represents a sulfo group, with an alpha-naphthylamine (second component) having the following probable formula

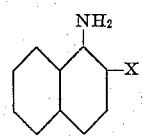

wherein X denotes a hydrogen atom or an alkoxy group, diazotizing the resulting amino azo compound and coupling it with a Cleve's acid (1)-amino naphthalene-7 (or 6)-sulfonic (acid) (third component), diazotizing the resulting amino-disazo dye and coupling it with 1-amino-8-hydroxy-naphthalene-4-sulfonic acid (fourth component) to form an amino trisazo dye.

The new trisazo dyes are salts of an acid represented by the following probable formula:

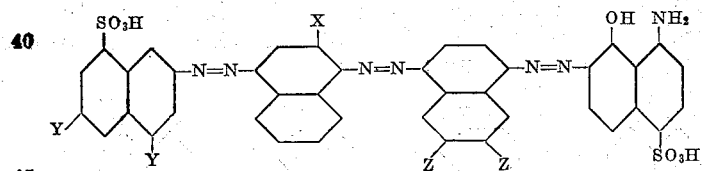

in which X represents a hydrogen atom or an alkoxy group, e. g., $OCH_3$, $OC_2H_5$, $OC_3H_7$, $OC_4H_9$, etc., one Y represents a hydrogen atom and the other Y represents a sulfo group, and one Z represents a hydrogen atom and the other Z represents a sulfo group. In the dry state and in the form of their sodium salts, they are dark powders soluble in water, soluble in concentrated sulfuric acid giving blue solutions, and from a neutral or alkaline bath dye cotton grayish blue to bluish gray shades which are fast to light and washing and are capable of being discharged to a white by the action of sodium hydrosulfite.

The following example will further illustrate the invention, but it will be understood that the invention is not limited thereto. The parts are by weight.

*Example.*—19.5 parts of 2-amino naphthalene-4.8-disulfonic acid are dissolved in 500 parts water and 28.5 parts of 50° Bé. sulfuric acid and are diazotized at 0°–8° C. in the usual manner using 4.3 parts sodium nitrite. An excess of sodium nitrite is to be avoided. To the diazo solution thus obtained there are added, with stirring, 8.6 parts of alpha-naphthylamine previously dissolved in 350 parts water and 9.3 parts of hydrochloric acid of 20° Bé., the temperature of the reaction mixture being kept below 10° C. by the addition of ice. When the coupling is complete, which ordinarily requires about 5 to 6 hours, the resulting solution of the monazo dye thus obtained is diazotized at a temperature of 15° C. by addition thereto of 4.7 parts of sodium nitrite. Upon the completion of the diazotization, 120 parts of salt are added and the precipitated diazo-azo compound is filtered off. The diazo-azo compound thus obtained is then suspended in 280 parts of water at 5°–10° C. and 12.1 parts of the sodium salt of 1-amino naphthalene-7-sulfonic acid (1.7 Cleve's acid) are added to the suspension. After stirring the mixture for several hours, 12 parts of sodium acetate are added, and the coupling completed by further stirring for some time. When the coupling is complete, the mixture is diluted to a volume of about 600 parts, and sufficient caustic soda added (about 4.5 parts) to dissolve the precipitated amino-disazo compound. The solution is cooled to 0° C. and diazotized by the addition of 35 parts of hydrochloric acid, 20° Bé. and 4.5 parts sodium nitrite. A small excess of sodium nitrite does no harm. When the diazotization of the amino disazo dye is complete, the resulting solution of the diazo-disazo compound is added to 13.2 parts of 1.8-amino naphthol-4-sulfonic acid (S-acid) previously dissolved in 210 parts water, 8.8 parts of 50 per cent caustic liquor and 30 parts of soda ash, and cooled to 0° C. A slight excess of S-acid should be present throughout the coupling. When the coupling is complete, the trisazo dye is salted out, filtered, pressed, and dried. The new trisazo dye thus obtained is a sodium salt of an acid having the following probable formula:

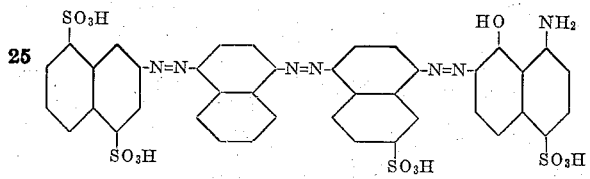

and in the dry state in the form of its sodium salt is a dark powder soluble in water, soluble in concentrated sulfuric acid giving a dark greenish blue color. It dyes cotton from a neutral or alkaline bath bluish gray to grayish blue shades which are of excellent fastness toward light and washing and are capable of being discharged to white by sodium hydro-sulfite. It dyes rayon shades similar to those obtained on cotton. It leaves both silk and acetyl-silk practically unstained.

Other valuable trisazo dyes may be produced in an analogous manner by employing 2-amino naphthalene-6.8-disulfonic acid in place of 2-amino naphthalene-4.8-disulfonic acid as first component, and/or a 2-alkoxy-1-naphthylamine in place of 1-naphthylamine as second component, and/or 1.6-Cleve's acid, or a mixture of 1.6 and 1.7 Cleve's acid in place of 1.7-Cleve's acid as third component.

I claim:

1. In the production of a trisazo dye, the process which comprises coupling a diazotized 2-amino naphthalene disulfonic acid having the following probable formula:

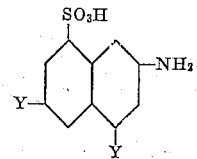

wherein one Y represents hydrogen and the other Y represents a sulfo group, with an alpha-naphthylamine having the following probable formula:

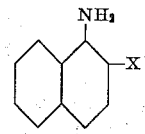

wherein X denotes a hydrogen atom or an alkoxy group, diazotizing the resulting amino-azo intermediate and coupling the resulting diazo-azo compound with a Cleve's acid to form an amino-disazo compound, diazotizing the said amino-disazo compound and coupling the resulting diazo-disazo compound with 1.8-amino naphthol-4-sulfonic acid to form a trisazo dye.

2. In the production of a trisazo dye, the process which comprises coupling diazotized 2-amino naphthalene-4.8-disulfonic acid with 1-naphthylamine, diazotizing the resulting amino-azo dye and coupling the resulting diazo-azo compound with 1.7-Cleve's acid to form an amino-disazo body, diazotizing the said amino-diazo body and coupling the resulting diazo-disazo compound with 1.8-amino naphthol-4-sulfonic acid to form a trisazo dye.

3. As new products, trisazo dyes having in the free state the following probable formula:

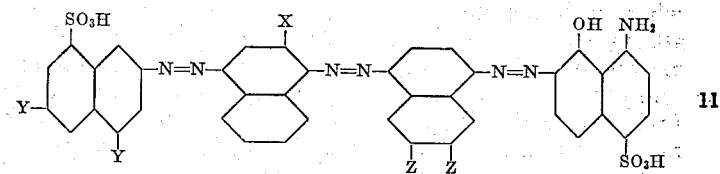

in which X denotes a hydrogen atom or an alkoxy group, one Y represents hydrogen and the other Y represents a sulfo group, and one Z represents a hydrogen atom and the other Z represents a sulfo group.

4. As a new product, the amino trisazo dye having in the free state the following probable formula:

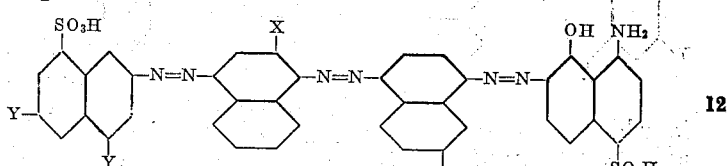

in which X denotes a hydrogen atom or an alkoxy group, and one Y represents a hydrogen atom and the other Y represents a sulfonic acid group.

5. As a new product, the amino trisazo dye having in the free state the following probable formula:

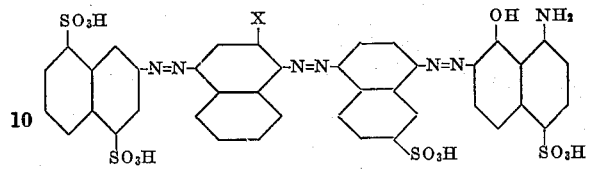

in which X denotes a hydrogen atom or an alkoxy group.

6. As a new product, the amino trisazo dye having in the free state the following probable formula:

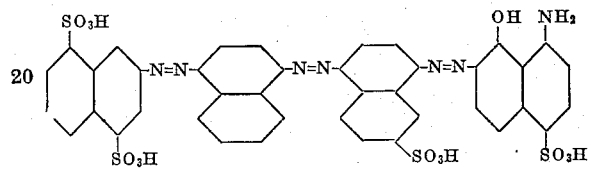

7. Material dyed with a dyestuff of claim 3.
8. Material dyed with a dyestuff of claim 4.
9. Material dyed with a dyestuff of claim 5.
10. Material dyed with the dyestuff of claim 6.
11. As a new product, the amino trisazo compound having in the free state the following probable formula

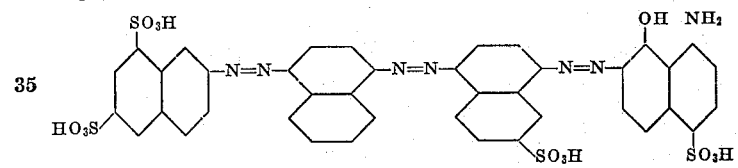

12. Material dyed with the dyestuff of claim 11.
13. As a new product, the amino trisazo compound having in the free state the following probable formula

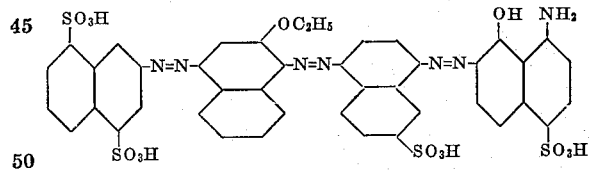

14. Material dyed with the dyestuff of claim 13.

In testimony whereof I affix my signature.

CHARLES S. DEWEY.